(12) United States Patent
Huang

(10) Patent No.: US 11,360,359 B2
(45) Date of Patent: Jun. 14, 2022

(54) ARRAY SUBSTRATE AND LIQUID CRYSTAL DISPLAY PANEL

(71) Applicant: WUHAN CHINA STAR OPTOELECTRONICS TECHNOLOGY CO., LTD., Hubei (CN)

(72) Inventor: Jianlong Huang, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 146 days.

(21) Appl. No.: 16/979,555

(22) PCT Filed: Aug. 28, 2020

(86) PCT No.: PCT/CN2020/112025
§ 371 (c)(1),
(2) Date: Sep. 10, 2020

(87) PCT Pub. No.: WO2022/036743
PCT Pub. Date: Feb. 24, 2022

(65) Prior Publication Data
US 2022/0050341 A1  Feb. 17, 2022

(30) Foreign Application Priority Data
Aug. 17, 2020  (CN) .......................... 202010824647.1

(51) Int. Cl.
*G02F 1/1345* (2006.01)
*G02F 1/1343* (2006.01)
*G02F 1/1362* (2006.01)

(52) U.S. Cl.
CPC ...... *G02F 1/13452* (2013.01); *G02F 1/13454* (2013.01); *G02F 1/13456* (2021.01); *G02F 1/13458* (2013.01); *G02F 1/134363* (2013.01); *G02F 1/1362* (2013.01)

(58) Field of Classification Search
CPC .......... G02F 1/134363; G02F 1/13452; G02F 1/13454; G02F 1/13456; G02F 1/13458
See application file for complete search history.

(56) References Cited

U.S. PATENT DOCUMENTS 9,696,592 B2 * 7/2017 Nishino ................ G02F 1/1368
2019/0086747 A1  3/2019 Chai et al.
(Continued)

FOREIGN PATENT DOCUMENTS

CN       1095823 A   11/1994
CN     105655360 A    6/2016
(Continued)

*Primary Examiner* — Dung T Nguyen
(74) *Attorney, Agent, or Firm* — Mark M. Friedman

(57) ABSTRACT

An array substrate and a liquid crystal display panel are provided, wherein the array substrate includes a display area and a non-display area, and a length of one end of via-holes close to the display area is not greater than 12.5 microns. By reducing a length of one end of the via-holes positioned at a boundary position between the display area and the non-display area close to the display area, a flow of polyimide fluid is guided and enables an edge of a polyimide film to cover an area where the via-holes are located.

20 Claims, 3 Drawing Sheets

(56) References Cited

U.S. PATENT DOCUMENTS

2019/0146291 A1* 5/2019 Liu .................. G02F 1/136259
                                                            257/72
2021/0018801 A1   1/2021 Liu et al.
2021/0364843 A1* 11/2021 Cai .................. G02F 1/134309

FOREIGN PATENT DOCUMENTS

| CN | 106950769 A | 7/2017 |
| CN | 109212845 A | 1/2019 |
| CN | 110928093 A | 3/2020 |

* cited by examiner

ARRAY SUBSTRATE AND LIQUID CRYSTAL DISPLAY PANEL

FIELD OF INVENTION

The application relates to a field of display technology, in particular to an array substrate and a liquid crystal display panel.

BACKGROUND OF INVENTION

In a liquid crystal display (LCD) panel industry, uneven display brightness (Mura) is an undesirable phenomenon that affects yield of panels, such as peripheral Mura, horizontal Mura, and diagonal Mura. Wherein, Mura caused by precision of a polyimide film and a film surface accounts for a majority.

Reasons for poor polyimide film are various. On the one hand, a difference in manufacturing process will cause a film surface or thickness precision of the polyimide film to be poor, wherein temperature, time, dispensed amounts, and print speed in the manufacturing process will all cause the film surface or thickness precision of the polyimide film to be poor. On the other hand, panel design can also cause poor film surface or thickness precision of the polyimide film.

In current design, when polyimide film is used to form an encapsulation layer by a printing method, the polyimide film will encounter a via-hole of path layer network (PLN) during a planarization and flow process. Due to an effect of surface tension and a longer length of one end of the via-hole close to a display area, the polyimide film will gather at an edge of the via-hole and its backflow will be obstructed. As a result, an area thicker than other normal areas will be formed at a boundary position between the display area and a non-display area, which will cause abnormal liquid crystal deflection, and Mura phenomenon will occur during lighting inspection.

Therefore, how to solve the technical problem of an abnormal coating of the polyimide film due to a current PLN via-hole, which further leads to a Mura phenomenon in LCD panels, is a problem that panel manufacturers all over the world have to overcome.

Technical Problem

An embodiment of the present application provides an array substrate and a liquid crystal display panel. It can solve the technical problem that coating of polyimide film is abnormal due to the PLN via-hole, which causes the Mura phenomenon of the liquid crystal display panel.

SUMMARY OF INVENTION

An embodiment of the present application provides an array substrate including a display area and a non-display area, and the array substrate including a substrate, a buffer layer disposed on the substrate, and a functional layer disposed on the buffer layer, the functional layer including: a source-drain layer disposed on the buffer layer; an inorganic insulating layer disposed on the source-drain layer; a common electrode layer disposed on the inorganic insulating layer, the common electrode layer connected to the source-drain layer; a passivation layer disposed on the common electrode layer; a pixel electrode layer disposed on the passivation layer; and an encapsulation layer disposed on the pixel electrode layer; wherein the pixel electrode layer positioned in the non-display area includes a plurality of via-holes on a side close to the display area, a length of one end of the via-hole close to the display area is not greater than 12.5 microns to play a role of guiding fluid when the encapsulation layer is coated.

In the array substrate provided by an embodiment of the present application, a distance between adjacent via-holes is not less than 30 microns to facilitate a coating of the encapsulation layer.

In the array substrate provided by an embodiment of the present application, a width of a cross-section of the via-hole is not less than 4 microns.

In the array substrate provided by an embodiment of the present application, one end of the via-hole close to the display area is an intersection and a shape of a cross-section of the via-hole is selected from elliptical, circular, or rhomboid.

In the array substrate provided by an embodiment of the present application, when the shape of the cross-section of the via-hole is rhomboid, a cross-section of the via-hole includes a first side, a second side, a third side, and a fourth side sequentially connected, the first side and the second side are positioned on one side of the via-hole close to the display area, the third side and the fourth side are positioned on one side of the via-hole away from the display area, and the first side and the second side intersect to form a first included angle, and the first included angle is not greater than 30 degrees.

In the array substrate provided by an embodiment of the present application, when the shape of the cross-section of the via-hole is elliptical, a long axis of the elliptical shape is perpendicular to a boundary line between the display area and the non-display area, and a ratio of the long axis to a short axis of the elliptical shape is not less than 3:1.

In the array substrate provided by an embodiment of the present application, when the shape of the cross-section of the via-hole is circular, a radius of the circular shape is not less than 2 microns.

In the array substrate provided by an embodiment of the present application, when one end of the via-hole close to the display area is linear, and a cross-section of the via-hole includes an elongated shape.

In the array substrate provided by an embodiment of the present application, the cross-section of the via-hole includes a fifth side, a sixth side, a seventh side, and an eighth side sequentially connected, and the fifth side and the seventh side are parallel to a boundary line between the display area and the non-display area, wherein the fifth side and the seventh side are wide sides of the cross-section of the via-hole, and the sixth side and the eighth side are long sides of the cross-section of the via-hole, a ratio of the long side to the wide side of the cross-section of the via-hole is not less than 2:1.

In the array substrate provided by an embodiment of the present application, an area of a cross-section of the via-hole is not less than 5% of an area of a cross-section of the common electrode layer to facilitate an electrical connection between the common electrode layer and the source-drain layer.

The present application also provides a liquid crystal display panel. The liquid crystal display panel includes an array substrate, and the array substrate includes a display area and a non-display area. The array substrate includes a substrate, a buffer layer disposed on the substrate, and a functional layer disposed on the buffer layer, the functional layer including: a source-drain layer disposed on the buffer layer; an inorganic insulating layer disposed on the source-drain layer; a common electrode layer disposed on the inorganic insulating layer, the common electrode layer connected to the source-drain layer; a passivation layer disposed on the common electrode layer; a pixel electrode layer disposed on the passivation layer; and an encapsulation layer disposed on the pixel electrode layer; wherein the pixel electrode layer positioned in the non-display area comprises a plurality of via-holes on a side close to the display area, a length of one end of the via-hole close to the display area is not greater than 12.5 microns to play a role of guiding fluid when the encapsulation layer is coated.

In the liquid crystal display panel provided by an embodiment of the present application, a distance between adjacent via-holes is not less than 30 microns to facilitate a coating of the encapsulation layer.

In the liquid crystal display panel provided by an embodiment of the present application, a width of a cross-section of the via-hole is not less than 4 microns.

In the liquid crystal display panel provided by an embodiment of the present application, one end of the via-hole close to the display area is an intersection and a shape of a cross-section of the via-hole is selected from elliptical, circular, or rhomboid.

In the liquid crystal display panel provided by an embodiment of the present application, when the shape of the cross-section of the via-hole is rhomboid, a cross-section of the via-hole includes a first side, a second side, a third side, and a fourth side sequentially connected, the first side and the second side are positioned on a side of the via-hole close to the display area, the third side and the fourth side are positioned on a side of the via-hole away from the display area, and the first side and the second side intersect to form a first included angle, and the first included angle is not greater than 30 degrees.

In the liquid crystal display panel provided by an embodiment of the present application, when the shape of the cross-section of the via-hole is elliptical, a long axis of the elliptical shape is perpendicular to a boundary line between the display area and the non-display area, and a ratio of the long axis to a short axis of the elliptical shape is not less than 3:1.

In the liquid crystal display panel provided by an embodiment of the present application, when the shape of the cross-section of the via-hole is circular, a radius of the circular shape is not less than 2 microns.

In the liquid crystal display panel provided by an embodiment of the present application, when one end of the via-hole close to the display area is linear, a cross-section of the via-hole includes an elongated shape.

In the liquid crystal display panel provided by an embodiment of the present application, the cross-section of the via-hole includes a fifth side, a sixth side, a seventh side, and an eighth side sequentially connected, and the fifth side and the seventh side are parallel to a boundary line between the display area and the non-display area, wherein the fifth side and the seventh side are wide sides of the cross-section of the via-hole, and the sixth side and the eighth side are long sides of the cross-section of the via-hole, a ratio of the long side to the wide side of the cross-section of the via-hole is not less than 2:1.

In the liquid crystal display panel provided by an embodiment of the present application, an area of a cross-section of the via-hole is not less than 5% of an area of a cross-section of the common electrode layer to facilitate an electrical connection between the common electrode layer and the source-drain layer.

Beneficial Effect

An array substrate and a liquid crystal display panel provided by the present application reduce a length of one end of the via-hole positioned at a boundary position between the display area and the non-display area close to the display area. As a result, in the process of coating a polyimide film to form an encapsulation layer, a flow of the polyimide fluid is guided. It also reduces an area obstructing the flow of the polyimide fluid and enables an edge of the polyimide film to cover an area where the via-hole is located. Therefore, the surrounding Mura phenomenon caused by the backflow of the polyimide fluid will not occur.

DESCRIPTION OF DRAWINGS

Following describes specific embodiments of the present application in detail with reference to accompanying drawings, which will make the technical solutions and other beneficial effects of the present application clear.

DETAILED DESCRIPTION OF PREFERRED EMBODIMENTS

Figure 1:
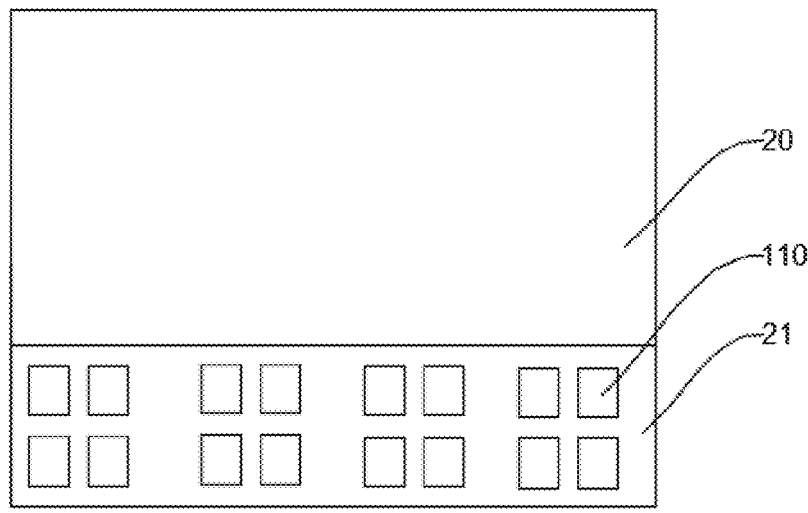
FIG. 1 is a schematic structural diagram of an array substrate provided by an embodiment of the present application.

The technical solutions in the embodiments of the present application will be clearly and completely described below with reference to the drawings in the embodiments of the present application. Obviously, the described embodiments are only a part of the embodiments of the present application, rather than all the embodiments. Based on the embodiments in this application, all other embodiments obtained by those skilled in the art without doing creative work are within the protection scope of this application.

Following disclosure provides various embodiments or examples for realizing different structures of the present application. To simplify the disclosure of the present application, components and settings of specific examples are described below. Certainly, they are only examples and are not intended to limit the application. Moreover, the present application may repeat reference numerals and/or reference letters in different examples, and this repetition is for the purpose of simplification and clarity, and does not indicate the relationship between the various embodiments and/or settings discussed. In addition, this application provides examples of various specific processes and materials, but those of ordinary skill in the art may be aware of the application of other processes and/or the use of other materials.

An array substrate is provided, as shown in FIG. 1. The array substrate 10 includes a display area 20 and a non-display area 21. The non-display area 21 is provided with a plurality of via-holes 110 on a side close to the display area 20, wherein the via-holes 110 are arranged in two rows and two columns.

It can be understood that when the via-holes 110 are designed in two rows and two columns, the end of the via-holes 110 close to the display area 20 has a longer length. Polyimide fluid will gather at an edge of the via-hole 110 and its backflow will be hindered. As a result, an area thicker than other normal areas will be formed at a boundary position between the display area 20 and the non-display area 21, which may cause abnormal liquid crystal deflection, and Mura phenomenon will occur during lighting inspection.

Figure 2:
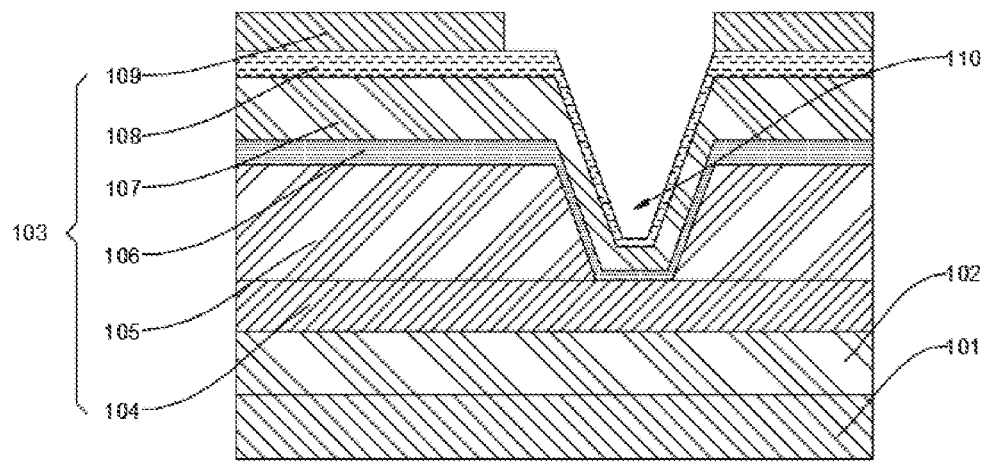
FIG. 2 is a schematic diagram of a first structure of another array substrate provided by an embodiment of the application.

Referring to FIG. 2. FIG. 2 is a schematic diagram of a first structure of another array substrate provided by an embodiment of the application. As shown in FIG. 2, an array substrate 10 provided by the embodiment of the present application includes a display area 20 and a non-display area 21. The array substrate 10 includes a substrate 101, a buffer layer 102 disposed on the substrate 101, and a functional layer 103 disposed on the buffer layer 102, wherein the functional layer 103 includes a source-drain layer 104 disposed on the buffer layer, an inorganic insulating layer 105 disposed on the source and drain, a common electrode layer 106 disposed on the inorganic insulating layer 105, a passivation layer 107 disposed on the common electrode layer 106, a pixel electrode layer 108 disposed on the passivation layer 107, and an encapsulation layer 109 disposed on the pixel electrode layer 108. In addition, the common electrode layer 106 is connected to the source-drain layer 104, and a plurality of via-holes 110 are provided on a side of the pixel electrode layer 108 in the non-display area 21 close to the display area 20.

A length of one end of the via-hole 110 close to the display area 20 is not greater than 12.5 microns. It is understandable that during a coating process of the polyimide film, an end of the via-hole 110 close to the display area 20 will form a blocking area. If this blocking area is too large, it will cause the polyimide fluid to flow back and accumulate there. As a result, a film thickness of the encapsulation layer 109 at an end of the via-hole 110 close to the display area 20 is thicker than other normal areas, which may cause abnormal deflection of liquid crystals and a peripheral Mura phenomenon. In the present application, a length of the end of the via-hole 110 close to the display area 20 is not greater than 12.5 microns. The length of the end of the via-hole 110 close to the display area 20 is sufficiently small so that the polyimide fluid will not accumulate at the end of the via-hole 110 close to the display area 20 during a flow process. Therefore, the deflection of the liquid crystals will not be abnormal, and of course, the surrounding Mura phenomenon will not appear.

In one embodiment, a length of one end of the via-hole 110 close to the display area 20 is not greater than 12.5 microns. Specifically, the length of the via-hole 110 close to the end of the display area 20 may be one of 5 micrometers, 10 micrometers, or 12.5 micrometers.

In one embodiment, a distance between adjacent via-holes 110 is not less than 30 micrometers. Specifically, the distance between via-holes 110 may be one of 30 micrometers, 40 micrometers, or 50 micrometers.

It is understandable that during a coating process of the polyimide film, if a distance between two adjacent via-holes 110 is too small, the polyimide fluid between two adjacent via-holes 110 will accumulate in the process of flowing. Thus, it is necessary to increase the distance between adjacent via-holes 110 as much as possible, so as to prevent the polyimide film from being piled up during the flow process. Therefore, setting the distance between adjacent via-holes 110 to be not less than 30 microns can prevent the polyimide fluid from accumulating during a flow process, thereby preventing an occurrence of abnormal liquid crystal deflection due to an accumulation of polyimide film, and there will be no surrounding Mura phenomenon.

In one embodiment, a width of the cross-section of the via-hole 110 is not less than 4 microns. Specifically, the width of the cross-section of the via-hole 110 may be one of 4 microns, 6 microns or 8 microns.

It is understandable that the via-hole 110 is formed by exposure, so a width of the cross-section of the via-hole 110 cannot be too small. Because if the width of the cross-section of the via-hole 110 is too small, the exposure method cannot be used to form the via-hole 110. Therefore, the width of the cross-section of the via-hole 110 is not less than 4 microns.

In one embodiment, a cross-sectional area of the via-hole 110 is not less than 5% of a cross-sectional area of the common electrode layer 106. Specifically, the cross-sectional area of the via hole 110 is one of 5%, 10%, or 15% of the cross-sectional area of the common electrode layer 106.

It can be understood that the purpose of providing the via-hole 110 is to electrically connect the common electrode with the source and drain. If the cross-sectional area of the via-hole 110 is too small relative to the common electrode layer 106, the common electrode cannot be electrically connected to the source and drain through the via-hole 110. Thus, a ratio of a cross-section of the via-hole 110 to that of the common electrode layer 106 needs to be increased. Therefore, the cross-sectional area of the via-hole 110 is not less than 5% of the cross-sectional area of the common electrode layer 106, which facilitates the electrical connection between the common electrode layer and the source-drain layer.

Figure 3:
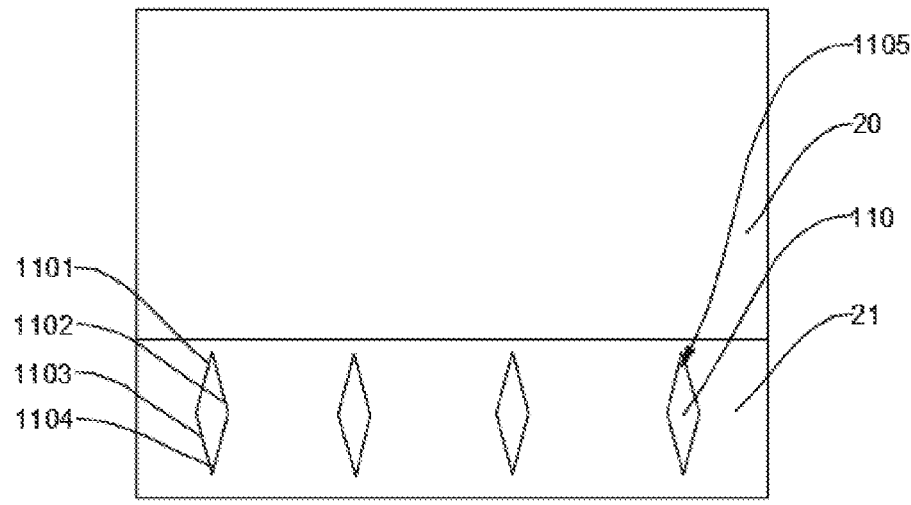
FIG. 3 is a schematic diagram of a second structure of another array substrate provided by an embodiment of the application.

Specifically, please refer to FIG. 3, which is a schematic diagram of a second structure of an array substrate provided by an embodiment of the application. As shown in FIG. 3, the array substrate 10 provided by the embodiment of the present application includes a display area 20 and a non-display area 21, wherein the non-display area 21 is provided with a plurality of via-holes 110 on a side close to the display area 20. The cross-section of the via-hole 110 is rhomboid. The via-hole 110 includes a first side 1101, a second side 1102, a third side 1103, and a fourth side 1104 that are connected in sequence. The first side 1101 and the second side 1102 are position on one side of the via-hole 110 close to the display area 20. The third side 1103 and the fourth side 1104 are position on one side of the via-hole 110 away from the display area 20, and the first side 1101 and the second side 1102 intersect to form a first included angle 1105.

It can be understood that the cross-section of the via-hole 110 is rhomboid. In a process of coating the polyimide film, a polyimide fluid will flow from a tip of the via-hole 110 close to the display area 20 to a direction away from the display area along the first side 1101 and the second side 1102. At this time, the tip, the first side 1101, and the second side 1102 of the via-hole 110 will play a guiding effect on the flow of the polyimide fluid, so that the polyimide fluid can flow smoothly through an area where the via-hole 110 is located. In addition, since one end of the via-hole 110 close to the display area 20 is a tip, the via-hole 110 will not block the polyimide fluid when the polyimide fluid is flowing, and will not cause accumulation of the polyimide fluid. Furthermore, a deflection of the liquid crystals will not be abnormal, and a peripheral Mura phenomenon will not appear.

In one embodiment, the first included angle 1105 is not greater than 30 degrees. Specifically, the angle of the first included angle 1105 may be one of 10 degrees, 20 degrees, or 30 degrees.

It can be understood that the larger the first included angle 1105, the larger the area that the polyimide fluid needs to flow through when flowing to the area where the via-hole 110 is located during the coating process of the polyimide film. On the one hand, a flow force of the polyimide fluid may not be enough to flow smoothly through the area where the via-hole 110 is located. On the other hand, the polyimide fluid will accumulate when flowing through adjacent via-holes 110 area. Therefore, reducing the angle of the first included angle 1105 can reduce the occurrence of the above phenomenon and prevent the occurrence of peripheral Mura due to the above phenomenon.

In one embodiment, a distance between an end of a cross-section of the via-hole 110 close to the display area and an end far away from the display area is not less than 25 microns. Specifically, a distance between the end of the via-hole 110 close to the display area 20 and the end of the via-hole 110 far away from the display area 20 may be one of 25 micrometers, 35 micrometers, or 40 micrometers.

In one embodiment, a distance between an end of the cross-section of the via-hole 110 close to the display area 20 and an end of that far away from the display area 20 is not less than 4 microns. Specifically, a distance between an end of the cross-section of the via-hole 110 closes to the display area 20 and an end of that far away from the display area 20 may be one of 4 microns, 7 microns, or 10 microns.

It is understandable that a distance between an end of the cross-section of the via-hole 110 close to the display area 20 and an end of that far away from the display area 20 must be no less than 4 microns. In this way, the via-hole 110 with a rhomboid cross-section can be formed by exposure.

Figure 4:
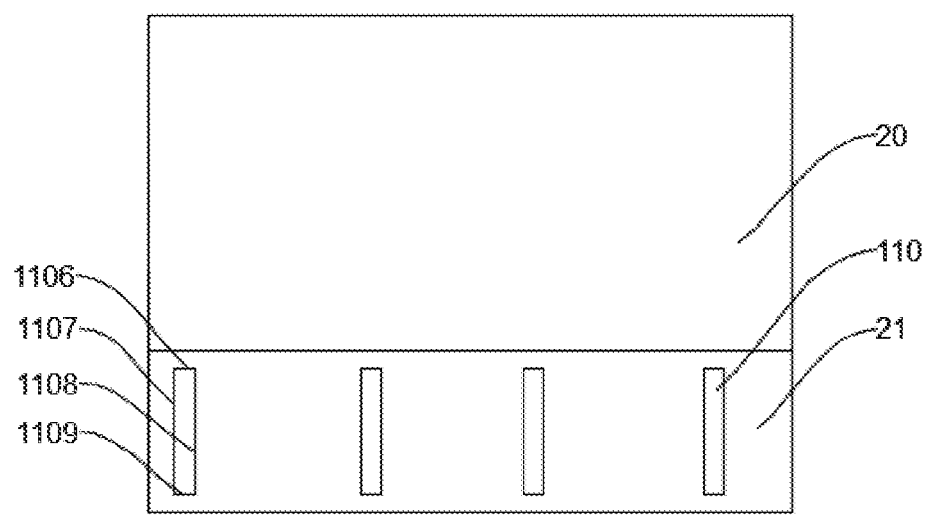
FIG. 4 is a schematic diagram of a third structure of another array substrate provided by an embodiment of the application.

Specifically, please refer to FIG. 4, which is a schematic diagram of a third structure of an array substrate provided by an embodiment of the application. As shown in FIG. 4, the array substrate 10 provided by the embodiment of the present application includes a display area 20 and a non-display area 21, wherein a plurality of via-holes 110 are provided on the side of the non-display area 21 close to the display area 20. The cross-section of the via-hole 110 is elongated, and the cross-section of the via-hole 110 includes a fifth side 1106, a sixth side 1107, a seventh side 1108, and an eighth side 1109 that are connected in sequence. The fifth side 1106 and the seventh side 1108 are both parallel to a boundary line of the display area 20 and the non-display area 21. In addition, the fifth side 1106 and the seventh side 1108 are wide sides of the cross-section of the via-hole 110, and the sixth side 1107 and the eighth side 1109 are long sides of the cross-section of the via-hole 110.

In one embodiment, a length of a wide side of the cross-section of the via-hole 110 is not greater than 12.5 microns. Specifically, the length of the wide side of the cross-section of the via-hole 110 is one of 5 micrometers, 10 micrometers, or 12.5 micrometers.

It is understandable that during a coating process of the polyimide film, an end of the via-hole 110 close to the display area 20 will form a blocking area. If this blocking area is too large, it will cause the polyimide fluid to flow back and accumulate there. As a result, a film thickness of the encapsulation layer 109 at an end of the via-hole 110 close to the display area 20 is thicker than other normal areas, which may cause abnormal deflection of the liquid crystals and a peripheral Mura phenomenon. In the present application, a length of the end of the via-hole 110 close to the display area 20 is not greater than 12.5 microns. The length of the end of the via-hole 110 close to the display area 20 is sufficiently small so that the polyimide fluid will not accumulate at the end of the via-hole 110 close to the display area 20 during a flow process. Therefore, the deflection of the liquid crystals will not be abnormal, and of course, the surrounding Mura phenomenon will not appear.

In one embodiment, a length of the wide side of the cross-section of the via-hole 110 is not less than 4 microns. Specifically, a length of the wide side of the cross-section of the via-hole 110 may be one of 4 micrometers, 6 micrometers, or 8 micrometers.

It is understandable that if a length of a wide side of the cross-section of the via-hole 110 is less than 4 microns, the via-hole 110 cannot be formed through an exposure process. Therefore, the length of the wide side of the cross-section of the via-hole 110 needs to be not less than 4 microns.

In one embodiment, a ratio of a length of the long side of the cross-section of the via-hole 110 to a length of the wide side of the cross-section of the via-hole 110 is not less than 2:1. Specifically, a ratio of the length of the long side of the cross-section of the via-hole 110 to the length of the wide side of the cross-section of the via-hole 110 is one of 2:1, 3:1, or 4:1.

It is understandable that the cross-sectional area of the via-hole 110 needs to reach 5% of the cross-sectional area of the common electrode layer 106 under a premise that a length of the wide side of the cross-section of the via-hole 110 is not greater than 12.5 microns. Therefore, it is necessary to increase the length of the long side of the cross-section of the via-hole 110. That is, a ratio of the length of the long side of the cross-section of the via-hole 110 to the wide side of the cross-section of the via-hole 110 is not less than 2:1.

Figure 5:
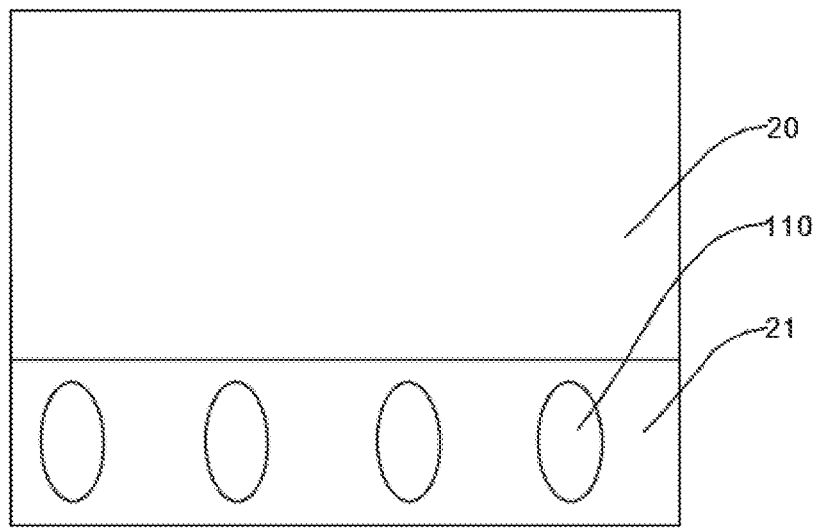
FIG. 5 is a schematic diagram of a fourth structure of another array substrate provided by an embodiment of the application.

Specifically, please refer to FIG. 5. FIG. 5 is a schematic diagram of a fourth structure of an array substrate provided by an embodiment of the application. As shown in FIG. 5, the array substrate 10 provided by the embodiment of the present application includes a display area 20 and a non-display area 21, wherein the non-display area 21 is provided with a plurality of via-holes 110 on a side close to the display area 20. The cross-section of the via-hole 110 is oval.

It can be understood that when the cross-section of the via-hole 110 is elliptical, the outside of the cross-section of the via-hole 110 is curved. Therefore, it can play a role in guiding the flow of the polyimide fluid during the coating process of the polyimide film. It is favorable for the polyimide fluid to flow through the area where the via-hole 110 is located, and no accumulation occurs in the area where the via-hole 110 is located, and of course, no surrounding Mura phenomenon will occur.

In one embodiment, a ratio of the long axis of the cross-section of the via-hole 110 to the short axis of the cross-section of the via-hole 110 is not less than 3:1. Specifically, the ratio of the long axis of the cross-section of the via-hole 110 to the short axis of the cross-section of the via-hole 110 is one of 3:1, 4:1, or 5:1.

It can be understood that the greater the ratio of the long axis of the cross-section of the via-hole to the short axis of the cross-section of the via-hole, the outer side of the cross-section of the via-hole has a greater diversion effect on the flow of the polyimide fluid in the process of coating the polyimide film.

In one embodiment, a length of the short axis of the cross-section of the via-hole 110 is not less than 4 microns. Specifically, a length of the short axis of the cross-section of the via-hole 110 is one of 4 microns, 6 microns, or 8 microns.

It is understandable that if the short axis length of the cross-section of the via-hole 110 is less than 4 microns, the elliptical via-hole 110 cannot be formed through an exposure process. Therefore, the short axis length of the cross-section of the via-hole 110 must not be less than 4 microns.

In one embodiment, the shape of the cross-section of the via-hole 110 can be circular. In this case, a radius of the cross-section of the via-hole 110 is not less than 2 microns.

It is understandable that when the shape of the cross-section of the via-hole 110 is circular, the outside of the cross-section of the via-hole 110 is curved. Therefore, it can play a role in guiding the flow of the polyimide film during the coating process of the polyimide film.

It is understandable that if a length of the cross-sectional radius of the via-hole 110 is less than 2 microns, the circular via-hole 110 cannot be formed through an exposure process. Therefore, the length of the cross-sectional radius of the via-hole 110 must not be less than 2 microns.

The array substrate provided by the present application reduces the length of one end of the via-hole 110 positioned at a boundary between the display area 20 and the non-display area 21 close to the display area 20. As a result, in the process of coating a polyimide film to form an encapsulation layer 109, a flow of a polyimide fluid is guided. It also reduces an area obstructing the flow of the polyimide fluid, and enables an edge of the polyimide film to cover an area where the via-hole is located. Therefore, the surrounding Mura phenomenon caused by the backflow of the polyimide film will not occur.

The present application also provides a liquid crystal display panel. The liquid crystal display panel includes the array substrate described in the above-mentioned embodiments, which will not be repeated herein.

The liquid crystal display panel provided by the present application reduces the length of one end of the via-hole 110 positioned at a boundary position between the display area 20 and the non-display area 21 close to the display area 20. As a result, in the process of coating a polyimide film to form an encapsulation layer 109, a flow of a polyimide fluid is guided. It also reduces an area obstructing the flow of the polyimide fluid, and enables an edge of the polyimide film to cover an area where the via-hole is located. Therefore, the surrounding Mura phenomenon caused by the backflow of the polyimide film will not occur.

In the above embodiments, the description of each embodiment has its own focus. For parts that are not described in detail in an embodiment, reference may be made to related descriptions of other embodiments.

The above describes in detail an array substrate and a liquid crystal display panel provided in the embodiments of the present application. Specific examples are used to describe the principles and implementation of the application, and the description of the above examples is only used to help understand the technical solutions and core ideas of the application. Those of ordinary skill in the art should understand: It is possible to modify the technical solutions stated in the embodiments, or equivalently replace some of the technical features. However, these modifications or replacements do not cause the essence of the corresponding technical solutions to deviate from the scope of the technical solutions of the embodiments of the present application.

What is claimed is:

1. An array substrate, comprising a display area and a non-display area, and the array substrate comprising a substrate, a buffer layer disposed on the substrate, and a functional layer disposed on the buffer layer, the functional layer comprising:
   a source-drain layer disposed on the buffer layer;
   an inorganic insulating layer disposed on the source-drain layer;
   a common electrode layer disposed on the inorganic insulating layer, wherein the common electrode layer is connected to the source-drain layer;
   a passivation layer disposed on the common electrode layer;
   a pixel electrode layer disposed on the passivation layer; and
   an encapsulation layer disposed on the pixel electrode layer;
   wherein a plurality of via-holes are provided on a side of the pixel electrode layer positioned in the non-display area close to the display area, and a length of one end of the via-holes close to the display area is not greater than 12.5 microns to provide a flow guiding performance when forming the encapsulation layer.

2. The array substrate according to claim 1, wherein a distance between adjacent via-holes is not less than 30 microns to facilitate a coating of the encapsulation layer.

3. The array substrate according to claim 1, wherein a width of a cross-section of the via-holes is not less than 4 microns.

4. The array substrate according to claim 1, wherein one end of the via-holes close to the display area is an intersection and a shape of a cross-section of the via-holes is selected from elliptical, circular, or rhomboid.

5. The array substrate according to claim 4, wherein when the shape of the cross-section of the via-holes is rhomboid, the cross-section of the via-holes comprises a first side, a second side, a third side, and a fourth side sequentially connected, the first side and the second side are positioned on one side of the via-holes close to the display area, the third side and the fourth side are positioned on one side of the via-holes away from the display area, the first side and the second side intersect to form a first included angle, and the first included angle is not greater than 30 degrees.

6. The array substrate according to claim 4, wherein when the shape of the cross-section of the via-holes is elliptical, a long axis of the elliptical shape is perpendicular to a boundary line between the display area and the non-display area, and a ratio of the long axis to a short axis of the elliptical shape is not less than 3:1.

7. The array substrate according to claim 6, wherein when the shape of the cross-section of the via-holes is circular, a radius of the circular shape is not less than 2 microns.

8. The array substrate according to claim 1, wherein when one end of the via-holes close to the display area is linear, a cross-section of the via-holes comprises an elongated shape.

9. The array substrate according to claim 8, wherein the cross-section of the via-holes comprises a fifth side, a sixth side, a seventh side, and an eighth side sequentially connected, and the fifth side and the seventh side are parallel to a boundary line between the display area and the non-display area, wherein the fifth side and the seventh side are wide sides of the cross-section of the via-holes, the sixth side and the eighth side are long sides of the cross-section of the via-holes, and a ratio of the long sides to the wide sides of the cross-section of the via-holes is not less than 2:1.

10. The array substrate according to claim 1, wherein an area of a cross-section of the via-holes is not less than 5% of an area of a cross-section of the common electrode layer to facilitate an electrical connection between the common electrode layer and the source-drain layer.

11. A liquid crystal display panel, comprising an array substrate, the array substrate comprising a display area and a non-display area, and the array substrate comprising a substrate, a buffer layer disposed on the substrate, and a functional layer disposed on the buffer layer, the functional layer comprising:

a source-drain layer disposed on the buffer layer;

an inorganic insulating layer disposed on the source-drain layer;

a common electrode layer disposed on the inorganic insulating layer, wherein the common electrode layer is connected to the source-drain layer;

a passivation layer disposed on the common electrode layer;

a pixel electrode layer disposed on the passivation layer; and an encapsulation layer disposed on the pixel electrode layer;

wherein a plurality of via-holes are provided on a side of the pixel electrode layer positioned in the non-display area close to the display area, and a length of one end of the via-holes close to the display area is not greater than 12.5 microns to provide a flow guiding performance when forming the encapsulation layer.

12. The liquid crystal display panel according to claim 11, wherein a distance between adjacent via-holes is not less than 30 microns to facilitate a coating of the encapsulation layer.

13. The liquid crystal display panel according to claim 11, wherein a width of a cross-section of the via-holes is not less than 4 microns.

14. The liquid crystal display panel according to claim 11, wherein one end of the via-holes close to the display area is an intersection and a shape of a cross-section of the via-holes is selected from elliptical, circular, or rhomboid.

15. The liquid crystal display panel according to claim 14, wherein when the shape of the cross-section of the via-holes is rhomboid, the cross-section of the via-holes comprises a first side, a second side, a third side, and a fourth side sequentially connected, the first side and the second side are positioned on a side of the via-holes close to the display area, the third side and the fourth side are positioned on a side of the via-hole away from the display area, the first side and the second side intersect to form a first included angle, and the first included angle is not greater than 30 degrees.

16. The liquid crystal display panel according to claim 14, wherein when the shape of the cross-section of the via-holes is elliptical, a long axis of the elliptical shape is perpendicular to a boundary line between the display area and the non-display area, and a ratio of the long axis to a short axis of the elliptical shape is not less than 3:1.

17. The liquid crystal display panel according to claim 14, wherein when the shape of the cross-section of the via-holes is circular, a radius of the circular shape is not less than 2 microns.

18. The liquid crystal display panel according to claim 11, wherein when one end of the via-holes close to the display area is linear, a cross-section of the via-holes comprises an elongated shape.

19. The liquid crystal display panel according to claim 18, wherein the cross-section of the via-holes comprises a fifth side, a sixth side, a seventh side, and an eighth side sequentially connected, and the fifth side and the seventh side are parallel to a boundary line between the display area and the non-display area, wherein the fifth side and the seventh side are width sides of the cross-section of the via-holes, the sixth side and the eighth side are long sides of the cross-section of the via-holes, and a ratio of the long sides to the width sides of the cross-section of the via-holes is not less than 2:1.

20. The liquid crystal display panel according to claim 11, wherein an area of a cross-section of the via-holes is not less than 5% of an area of a cross-section of the common electrode layer to facilitate an electrical connection between the common electrode layer and the source-drain layer.

* * * * *